(12) United States Patent
Miyano

(10) Patent No.: US 6,600,574 B2
(45) Date of Patent: Jul. 29, 2003

(54) PRINTING METHOD USING COLORS HAVING SPECIAL TONES

(75) Inventor: Tsuyoshi Miyano, Iwate-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/364,511

(22) Filed: Jul. 30, 1999

(65) Prior Publication Data

US 2003/0086101 A1 May 8, 2003

(30) Foreign Application Priority Data

Jul. 31, 1998 (JP) .......................... 10-217807

(51) Int. Cl.⁷ .............................. G06F 15/00; G03F 3/10
(52) U.S. Cl. .................................. 358/1.9; 358/527
(58) Field of Search ...................... 358/1.9, 527, 531, 358/528, 1.13, 1.15, 452, 296; 382/167, 162, 165, 166

(56) References Cited

U.S. PATENT DOCUMENTS

| | | | | | |
|---|---|---|---|---|---|
| 4,694,354 A | * | 9/1987 | Tanaka et al. | ............... | 358/296 |
| 5,257,097 A | * | 10/1993 | Pineau et al. | ............... | 358/500 |
| 5,416,890 A | * | 5/1995 | Beretta | ....................... | 395/131 |
| 5,508,718 A | * | 4/1996 | Haikin | ....................... | 345/150 |
| 5,631,747 A | * | 5/1997 | Farrell et al. | ............... | 358/448 |
| 5,675,717 A | * | 10/1997 | Yamamoto | .................. | 395/109 |
| 5,727,137 A | * | 3/1998 | LeClair et al. | .............. | 375/116 |
| 5,734,799 A | * | 3/1998 | Kusumoto et al. | .......... | 395/106 |
| 5,739,928 A | * | 4/1998 | Scott | .......................... | 358/520 |
| 5,748,342 A | | 5/1998 | Usami | ........................ | 358/500 |
| 5,847,848 A | * | 12/1998 | Suzuki et al. | ............... | 358/518 |
| 5,898,436 A | * | 4/1999 | Stewart et al. | .............. | 358/354 |
| 6,039,434 A | * | 3/2000 | Moroney | ..................... | 347/43 |
| 6,057,931 A | * | 5/2000 | McConnell et al. | ......... | 358/1.9 |
| 6,112,006 A | * | 8/2000 | Foss | .......................... | 348/222 |
| 6,275,829 B1 | * | 8/2001 | Angiulo et al. | ............. | 707/104 |

FOREIGN PATENT DOCUMENTS

JP 9-193477 7/1997

* cited by examiner

Primary Examiner—Madeleine Nguyen
(74) Attorney, Agent, or Firm—Brinks Hofer Gilson & Lione

(57) ABSTRACT

A color printing method securely performs high definition color printing using colors including characteristic colors without using special application software. The color printing method displays a print image based on color-image data to be printed, as a preview image, on a display unit. For the previewed print image, each print content corresponding to each print purpose is designated. Based on the color-image data in which each print content is designated, color printing is performed.

2 Claims, 5 Drawing Sheets

PRINTING METHOD USING COLORS HAVING SPECIAL TONES

BACKGROUND OF THE INVENTION

1. Field of the Invention

The present invention relates to color printing methods, and in particular, to a color printing method using various metallic colors such as metallic gold, and other colors (hereinafter referred to as "characteristic colors") having special tones.

2. Description of the Related Art

In color printers, in general, color-image data to be printed, created using a type of application program, are input to a printer driver, and the printer driver controls the operation of printing in accordance with common red, green, and blue (RGB) color-scheme components recognized by both the application program and the printer driver.

Such conventional printers use four primary colors, yellow, magenta, cyan, and black, to perform printing using approximately 16,000,000 colors.

Recently, not only conventional color printing using the four primary colors, but also color printing using characteristic colors such as metallic gold is performed.

For performing color printing using characteristic colors, the conventional printers use, between the application program and the printer driver, predetermined RGB color-scheme components fixed for characteristic colors. When the application program creates color-image data, it uses the RGB color-scheme components to designate a characteristic color region, and the printer driver performs color printing in accordance with the fixed RGB color-scheme components used for designation. Each fixed RGB color-scheme component is normally set for each characteristic color. For example, RGB color-scheme components fixed for metallic gold are set as follows: R=64/255, G=72/255, and B=200/255.

In an application program that cannot set a color scheme by using the above-described, predetermined RGB color-scheme components fixed for characteristic colors, printing using characteristic colors cannot be performed.

In order to perform printing using the desired colors, an application program that can designate fixed RGB color-scheme components corresponding to the desired colors must be used.

SUMMARY OF THE INVENTION

Accordingly, it is an object of the present invention to provide a color printing method for securely performing high definition color printing using characteristic colors without using a special application program.

To this end, the foregoing object is achieved through provision of a color printing method including the steps of displaying a print image based on color-image data to be printed, as a preview image, on a display designating each print content in accordance with each print purpose for the previewed print image; and performing color printing based on the color-image data in which each print content is designated.

According to the color printing method, high definition printing using colors including characteristic colors can be securely performed without using a special application program.

The print content designation may be performed by automatically selecting a preprint/glossy-finish region obtained by analyzing a spool file input as the color-image data, designating a conversation mode for the preprint/glossy-finish region, and designating RGB color-scheme components for each object which are determined by the conversation mode designation.

According to the color printing method, operability is greatly improved. A high degree of freedom is obtained because a user arbitrarily designates regions to be processed and color-scheme components while viewing a preview image, and fine adjustments can be performed.

The designation of the RGB color-scheme components may be performed such that predetermined RGB color-scheme components fixed for characteristic colors, used by the printer driver, are designated for each characteristic color object designated in the spool file, and ordinary RGB color-scheme components are designated for each ordinary color object designated in the spool file. According to the color printing method, operability is greatly improved.

In addition, the designation of the preprint/glossy-finish region may be performed by selecting the use of a preprint region only, the use of both preprint and glossy-finish regions, the use of a glossy-finish region, or region cancellation. Accordingly, operability is greatly improved.

DESCRIPTION OF THE PREFERRED EMBODIMENT

Figure 1:
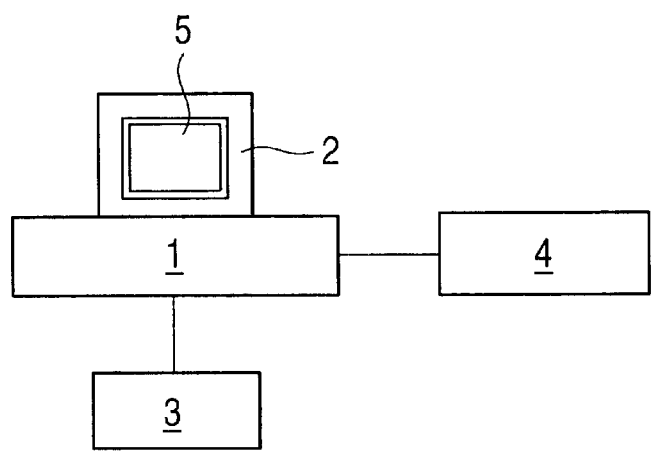
FIG. 1 is a block diagram showing a color printer system for practicing a color printing method of the present invention.
Figure 2:
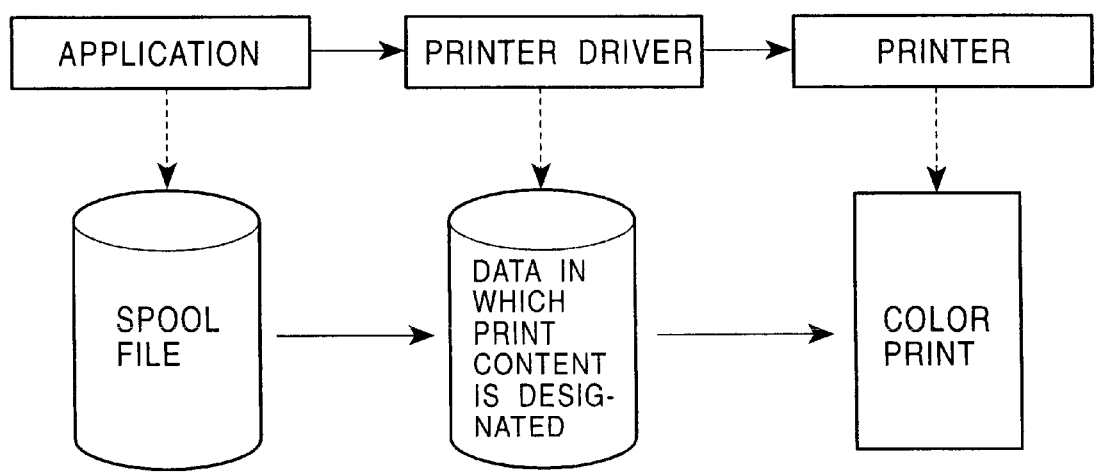
FIG. 2 is a drawing illustrating the motion of data according to a color printing method of the present invention.
Figure 3:
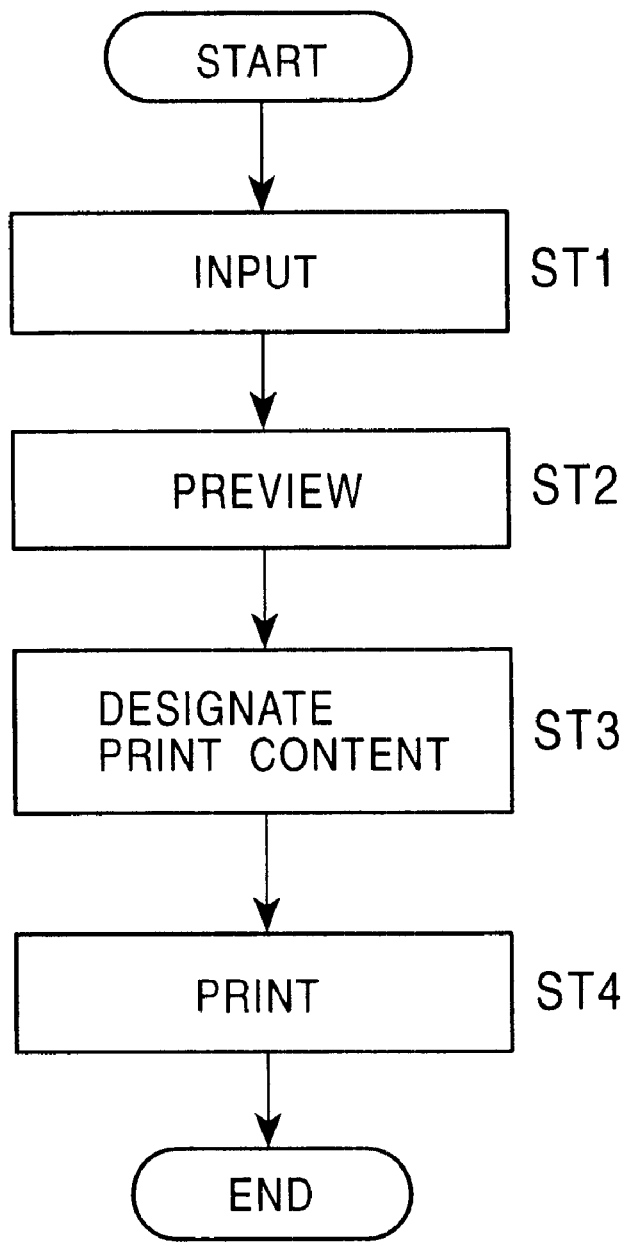
FIG. 3 is a flowchart showing a process of a color printing method of the present invention.

FIG. 1 shows a color print system for practicing a color printing method of the present invention. FIG. 2 shows the flow of data according to the color printing method. FIG. 3 shows a process of the color printing method.

Referring to FIG. 1, color image data to be printed are created by a data creating unit 1 including a CPU and a printer driver, a display 2, and a key board 3 (including a mouse) as an input unit, and a printer 4 performs color printing based on the color image data.

The color printing method of the present invention is described below with reference to FIGS. 2 and 3.

In step ST1 (shown in FIG. 3), color image data created by a predetermined application program are input. The color image data are directly input to the data creating unit 1 by using the key board 3, or externally created data are input to the data creating unit 1. The color image data are input as a spool file created by the application program, and are formed by combining a characteristic color part and an ordinary color part in accordance with purposes of printing.

In step ST2 (shown in FIG. 3), a print image 5 (shown in FIG. 1) based on the color image data is displayed as a preview image on the display 2 by a printer driver in the data creating unit 1 and appropriate software.

In step ST3 (shown in FIG. 3), for the previewed print image 5, a print content corresponding to a print purpose is designated. Specifically, for the previewed print image 5, the print content corresponding to the print purpose can be designated by using the key board 3, or can be automatically designated by the CPU of the data creating unit 1. At this time, for the characteristic color part and the ordinary color part, which are designated in the spool file, the print content for each print purpose is designated, as shown in FIG. 2. Specifically, for the characteristic color part, RGB color-scheme components fixed for characteristic colors, which are determined by the printer driver, are designated, and for the ordinary color part, ordinary RGB color-scheme components are designated. Accordingly, for the entirety of the print image 5 based on the spool file, print contents adapted for the print purposes are designated.

In step ST4 (shown in FIG. 3), the printer 4 performs color printing based on color-image data in which each print content is designated.

By performing secure color printing in step ST3 based on color-image data including characteristic colors, in which each print content is designated for each print purpose, a high-definition color print can be obtained.

Figure 4:
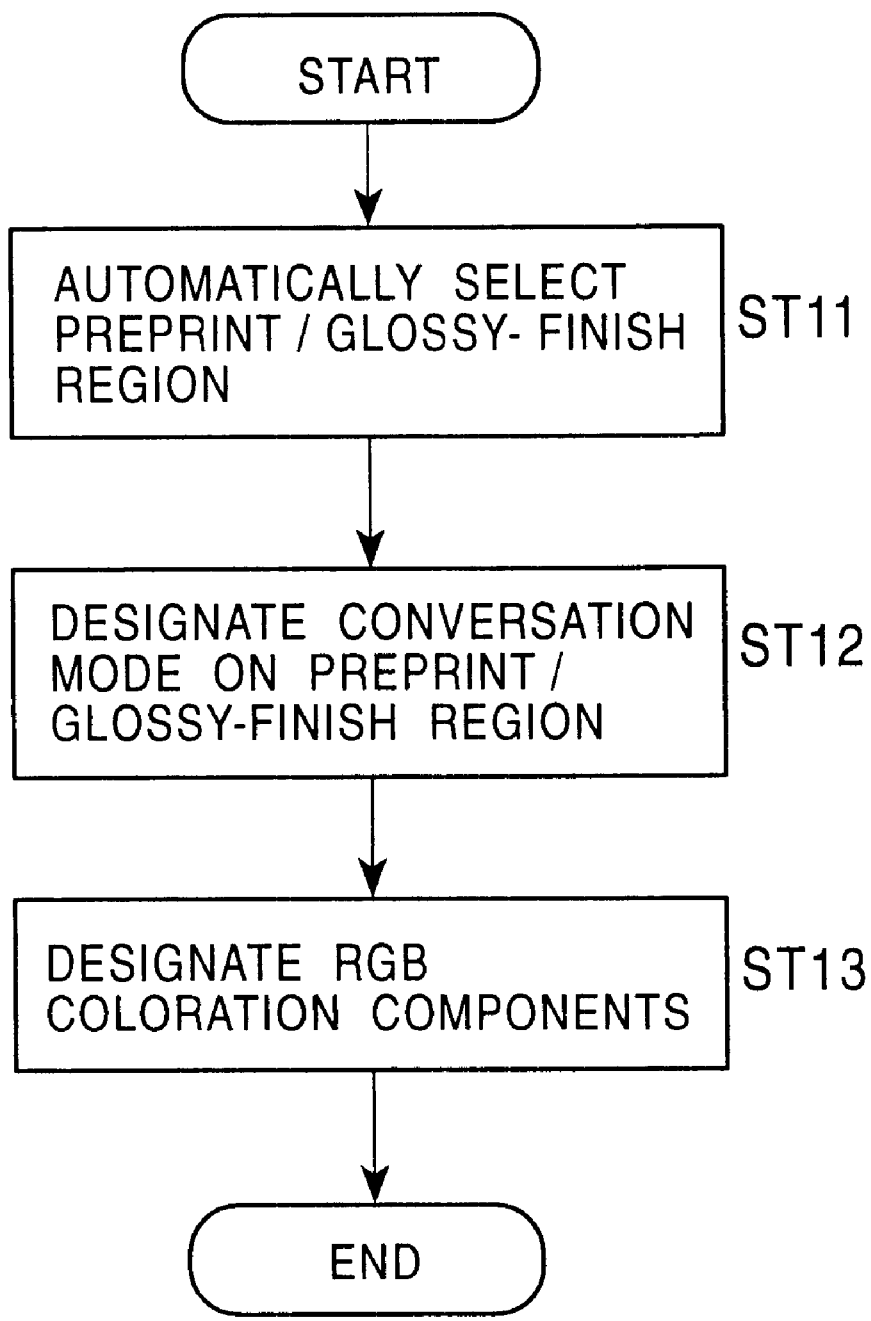
FIG. 4 is a flowchart showing a process for designating a print content.
Figure 5:
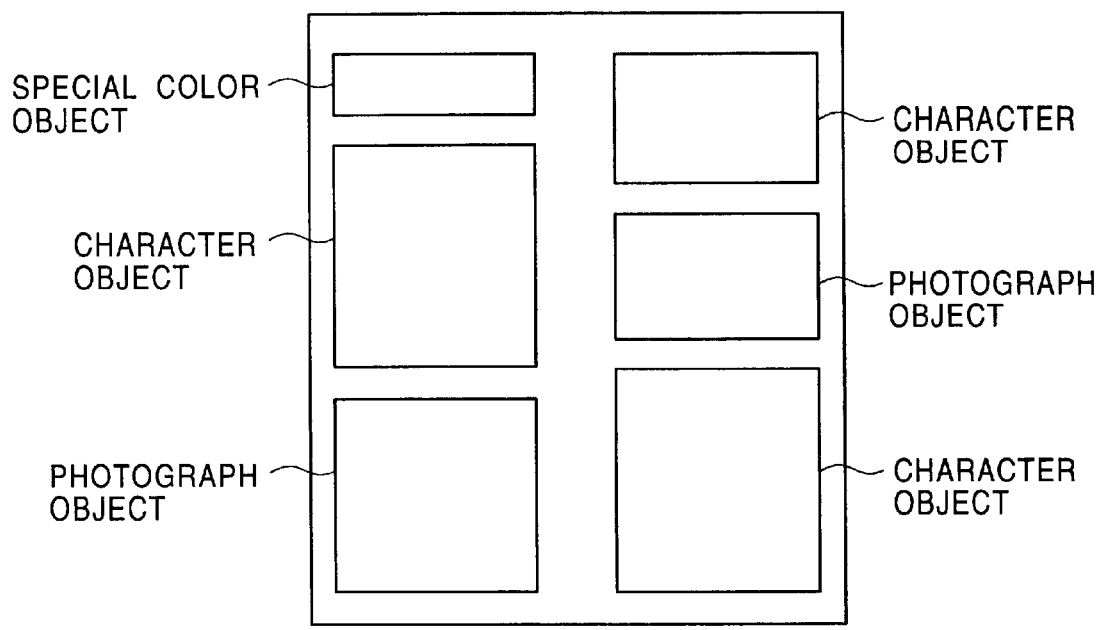
FIG. 5 is a drawing showing an example of an image of printing.

Designation of each print content in step ST3 is further described using an embodiment shown in FIGS. 4 to 7. FIG. 4 shows a process for the designation. FIG. 5 shows a previewed print image 5.

In step ST11, each "Preprint/Glossy-Finish" region is automatically selected.

Figure 6:
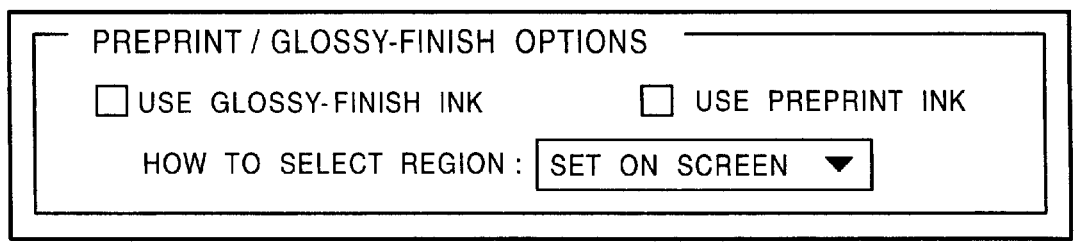
FIG. 6 is a drawing showing an example of a menu of preprint/glossy-finish options.

Specifically, this selection is performed by selecting the "Automatic" condition from the "Region Selection Menu" of the "Preprint/Glossy-Finish Options", as shown in FIG. 6.

Based on the selection of the "Automatic" condition, the printer driver in the data creating unit 1 automatically determines each "Preprint/Glossy-Finish" region by using a function of determining each "Photograph Object" or each "Non-Photograph Object" for the previewed print image 5. Actually, the spool data created by the application program are analyzed, and each rectangular "Preprint/Glossy-Finish" region is assigned to only each "Photograph Object". No "Preprint/Glossy-Finish" region is assigned to each "Non-Photograph Object". In order that the "Preprint/Glossy-Finish" region may be assigned to each "Non-Photograph Object", either the "Set on Screen" or the "Set for Entire Page" is selected from the "Region Selection Menu". The selection of print ink for the "Photograph Object" can be performed by selecting either or both of the "Use Glossy-Finish Ink" and the "Use Preprint Ink" in the "Preprint/Glossy-Finish Options" (shown in FIG. 6). This makes it possible to select a condition from among the use of the preprint ink, the use of both the preprint ink and the glossy-finish ink, and the use of only the glossy-finish ink. This selection needs to be performed in accordance with the feature of the application program for creating the color image data.

Figure 7:
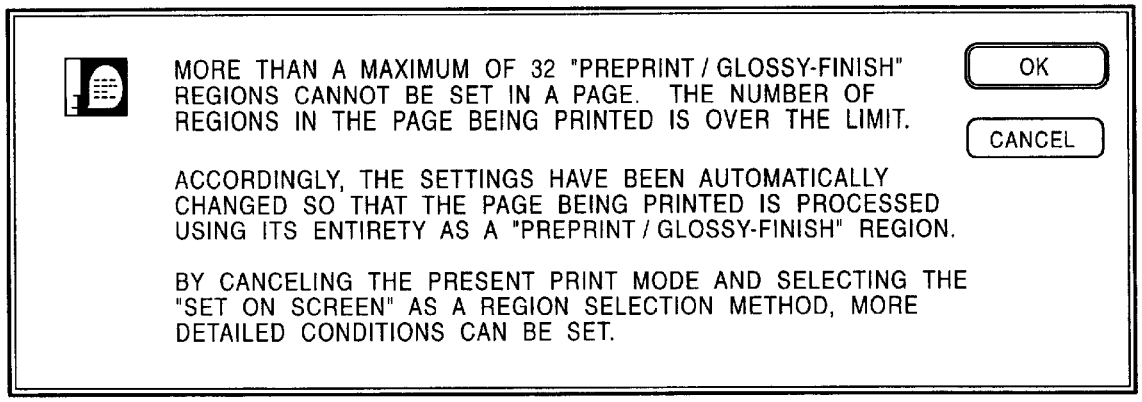
FIG. 7 is a drawing showing an example of alert messages.

Preferably, each page has a maximum of 32 "Preprint/Glossy-Finish" regions, and when the number of the regions exceeds the limit, the alert messages shown in FIG. 7 are displayed so that the processing mode of a page having more than 32 regions is automatically switched to a "Entirety" mode in which the entirety of the page is treated as a "Preprint/Glossy-Finish" region. When the "Set on Screen" mode is activated, the alert messages are not displayed, and the processing mode of the page having more than 32 regions must be switched to the "Entirety".

In step ST12, a conversation mode on the "Preprint/Glossy-Finish" region is designated.

By selecting the "Set on Screen" mode in step ST11, manual selection for the print image 5 shown in FIG. 5 can be performed from among the use of the preprint region only, the use of both the preprint and glossy-finish regions, the use of the glossy-finish region only, and cancellation of region designation.

In step ST13, designation of RGB color-scheme components for each object is performed.

It is preferable to manually perform this designation as a type of processing in step ST12.

Specifically, RGB color-scheme components fixed for characteristic colors are designated for each characteristic color object. Obviously, the RGB color-scheme components fixed for characteristic colors are based on a predetermined color scheme used for the printer driver in the data creating unit 1. For each non-photograph object, ordinary RGB color-scheme components are designated.

By performing steps ST11, ST12, and ST13, the designation of each print content for the print image 5 is completed, and printing in accordance with the designated contents is performed. The obtained print has high definition as a result of printing based on the color-image data in which each print content including characteristic colors is designated for each print purpose.

The present invention is not limited to the above-described embodiment, but may be modified if necessary.

The color printing method of the present invention has the foregoing construction and operations. Therefore, the color printing method provides an effect in that high definition color printing using colors including characteristic colors can be performed without using a special application program.

What is claimed is:

1. A color-image printing method-comprising the steps of:

inputting color image data to be printed as a spool file created by a predetermined application;

analyzing the input spool file; displaying, as a preview image, print image based on said inputted color-image data on a display means;

in response-to the previewed display screen.through a conversation mode designation, designating RGB color-scheme components fixed for characteristic colors in a given object part specified in said spool file;

the fixed RGB color-scheme components being set by a printer, and designating usual RGB color-scheme components for ordinary color object parts specified in said spool file, thereby designating RGB color-scheme components for every object of the displayed printed image;

performing color printing from a printer using the color-image data using the designated RGB color-scheme components, assigning one of pre-print and glossy-finish printing for each photograph object after the input spool file is analyzed; and determining if a number of regions on each photograph object is more than a set number, and if the number of regions is more than the set number then an entire surface of each photograph object is printed with the one of the pre-print and glossy-finish.

2. A color-image printing method according to claim 1, wherein said spool file is analyzed and pre-print/glossy-finish is automatically set at a photograph object region.

* * * * *

UNITED STATES PATENT AND TRADEMARK OFFICE
CERTIFICATE OF CORRECTION

PATENT NO. : 6,600,574 B2
DATED : July 29, 2003
INVENTOR(S) : Tsuyoshi Miyano

It is certified that error appears in the above-identified patent and that said Letters Patent is hereby corrected as shown below:

<u>Column 4,</u>
Line 36, delete "method-comprising" and substitute -- method comprising -- in its place.
Line 39, after "spool file;" begin a new paragraph with the word "displaying,".
Line 42, delete "response-to" and substitute -- response to -- in its place; and delete "screen.through" and substitute -- screen through -- in its place.

Signed and Sealed this

Sixth Day of January, 2004

JAMES E. ROGAN
*Director of the United States Patent and Trademark Office*